Sept. 9, 1924.  
J. FRANKENBERG  
1,507,591  
THERMOSTAT FOR REFRIGERATING APPARATUS  
Filed July 16, 1920    2 Sheets-Sheet 1
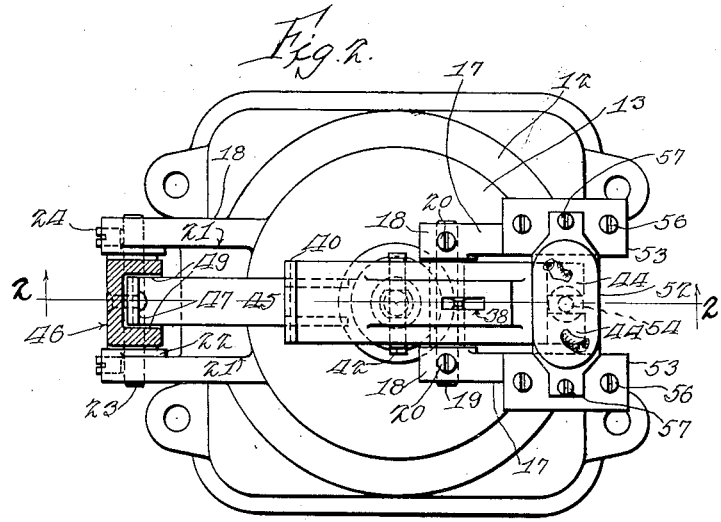
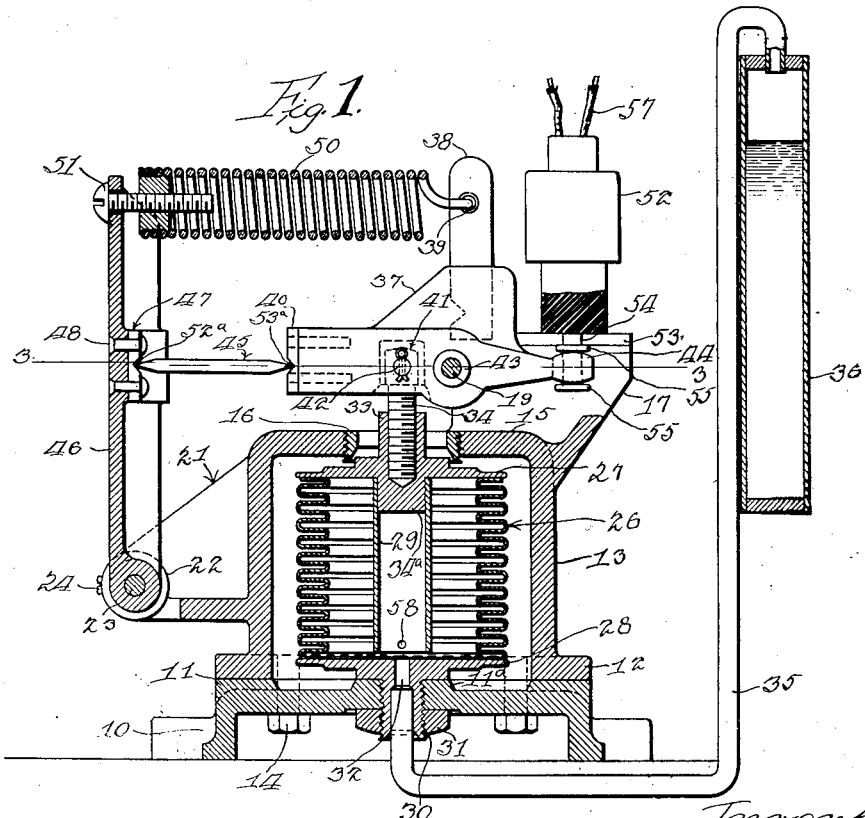

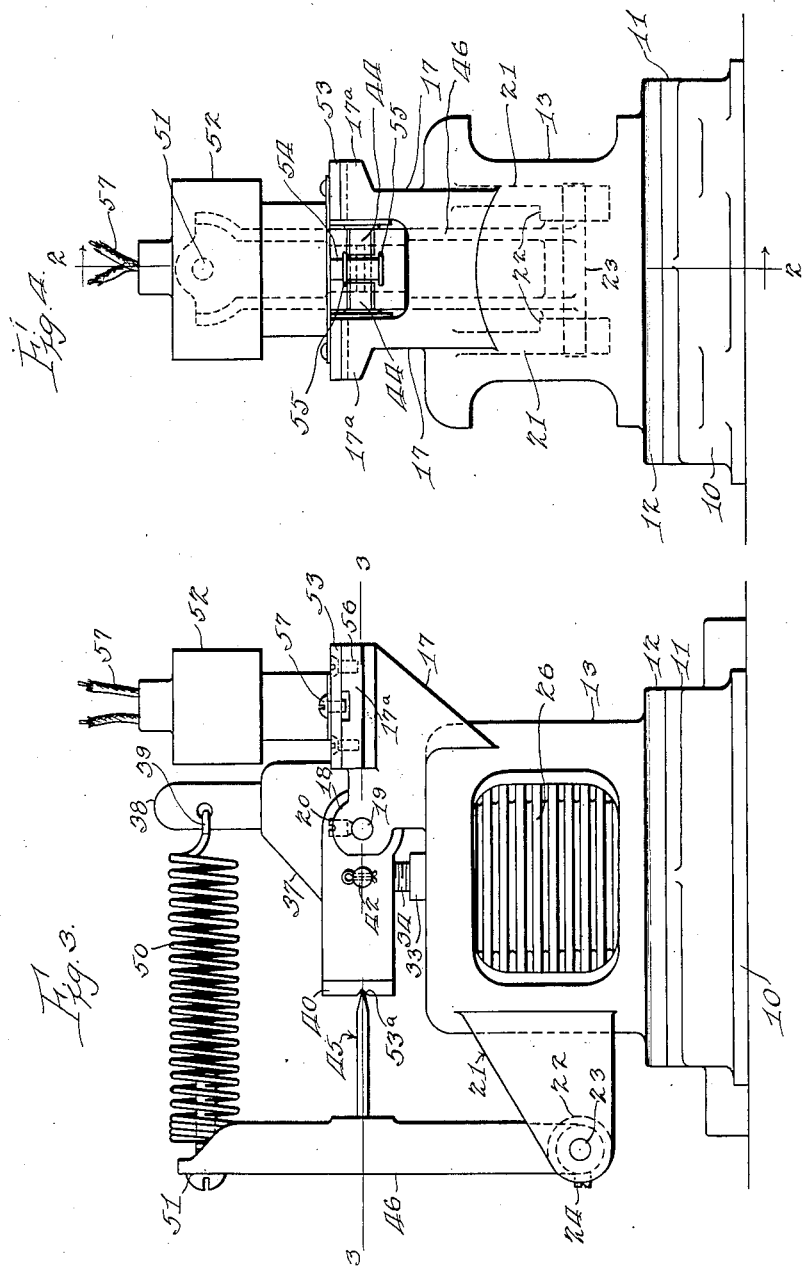

Patented Sept. 9, 1924.

1,507,591

UNITED STATES PATENT OFFICE.

JULIUS FRANKENBERG, OF CHICAGO, ILLINOIS.

THERMOSTAT FOR REFRIGERATING APPARATUS.

Application filed July 16, 1920. Serial No. 396,858.

*To all whom it may concern:*

Be it known that I, JULIUS FRANKENBERG, a citizen of the United States, and a resident of Chicago, in the county of Cook and State of Illinois, have invented certain new and useful Improvements in a Thermostat for Refrigerating Apparatus, of which the following is a specification.

This invention relates to improvements in apparatus used for the automatic starting or stopping of a prime mover, generally an electric motor, coupled to a refrigerating machine, to automatically control the temperatures of artificially refrigerated cold storage rooms.

The objects of my invention, are, to provide a thermostat for refrigerating apparatus and especially for domestic refrigerating units, for which latter purpose this device is especially adapted, on account of its accuracy, reliability of its operation, its durability, compactness and simplicity of construction or design; one which employs an extra heavy corrugated diaphragm to withstand possible high pressures corresponding to high temperatures to which the thermostat may at times be exposed; one which employs a compensating mechanism to offset the stiffness of said extra heavy corrugated diaphragm, and to obtain the necessary degree of sensitiveness; and one which employs a simple commercial pull and push electrical switch, controlled by a lever, forming a part of said thermostat, said switch throwing the motor coupled to the refrigerating machine in or out of circuit. Other objects and advantages of the invention will be disclosed in the subjoined specification and explanation.

In the accompanying drawings which serve to illustrate an embodiment of the invention—

Fig. 1 is a longitudinal vertical sectional view of the device taken on lines 2—2 of Figs. 2 and 4, looking in the direction indicated by the arrows.

Fig. 2 is a plan view partly in section of the apparatus but with the tension spring thereof omitted for the sake of clearness;

Fig. 3 is a side elevation thereof, and

Fig. 4 is an end elevation of the same adjacent the switch.

Like numerals of reference refer to corresponding parts throughout the different views of the drawings.

The reference numeral 10 designates a suitable base mainly square in cross section but ends at its top in a circular projection 11, upon which is concentrically bolted the flange 12 of the cylindrical housing 13 by means of bolts 14. As is clearly shown in the drawings, particularly in Fig. 1, a corrugated cylindrical diaphragm 26 is located in the housing 13, its axis coinciding with the axis of said housing. The bottom head of the diaphragm rests upon the projection 11ª of the base 10 and is firmly attached to the base 10 by means of the threaded end 30 and the nut 31. The top head 27 of the diaphragm has a boss 33 extending through the top of the housing 13 which boss is internally threaded for the reception of the pivot screw 34 and has also a boss 34ª extending into the interior space of the diaphragm to which is firmly fitted the stop 29 which may be made of any suitable tubing. This stop is for the purpose of limiting the down stroke of the diaphragm. Communication is had between the diaphragm and the vapor tube 36 which is suitably located within the space to be refrigerated, not shown, by means of a small pipe 35 and the opening 32 of the diaphragm, said pipe 35 being soldered in the end 30 of the lower head of the same. A threaded sleeve 16 is concentrically fitted in the top head of the housing 13, whereby the upward stroke of the diaphragm is adjusted, as clearly indicated in Fig. 1 of the drawings.

The top of the housing 13 has extended therefrom two parallel lugs 17 which have extensions 17ª upon which are bolted insulating fiber strips 53 by screws 56 and upon these strips is bolted the switch 52 by screws 57. A bearing pin 19 is located in the lugs 18 of said lugs 17 and is firmly held in position by the set screws 20. Pivotally located upon the pin 19 is the switch lever 37, and the diaphragm 26 is pivotally connected to said switch lever by the pin 42 and the pivot screw 34, said pivot screw having the enlarged end 41 for the reception of the pin 42. The forked curved portions 44 of the switch lever engage operatively between the flanges 55 of the push rod 54 of the switch 52. Since the switch lever 37 must be insulated at all times from the switch 52, I use insulating material for that purpose which can be molded into the desired shape as indicated in the drawings and such elements of the switch lever as the bronze bushing 43 for the pin 19, the lever arm 38 and the hardened steel plate 40 having a transversely disposed V-shaped groove, may be readily and accurately attached during the process of molding said switch lever.

An upwardly extending substantially U-shaped arm 46 is pivotally located upon the pin 23 and this pin is fixedly secured in the bosses 22 of the arms 21 which form parts of the housing 13. A suitable distance above the pin 23 and directly opposite to the plate 40 a hardened rectangular plate 47 is riveted to the back of the arm 46 and fits in between the two machined surfaces thereof and has a transversely disposed V-shaped groove as shown in Fig. 1, and a flat hardened steel bar 45 with its knife edges on its ends fits into the grooves of the plates 40 and 47, thus pivotally connecting the switch lever 37 and the upright arm 46. The horizontal line 3—3 of Fig. 1 will be hereafter referred to as the dead-center-line or position of the apparatus, and at a suitable distance above said dead center line and parallel to the same is located the tension spring 50, which connects the upper end of the arm 46 with the lever arm 38 by means of the screws 51 and the hooked end 39 of said spring. Since this spring 50 is at all times under tension, the bar 45 cannot drop out of the grooves into which the same is pivoted.

The device operates as follows: The primary motive force for the operation of the diaphragm 26 is obtained through the physical properties of any suitable volatile liquid with which the vapor tube 36 may be partly filled. I consider sulphur dioxide the best suited for this purpose, but any other suitable liquid may be used, requiring only a change of the dimensions of the apparatus. As clearly shown in Fig. 1 the diaphragm 26 is in its mid position and has been forced upwards by the gas pressure, an amount indicated by the distance left between the stop 29 and the bottom head 28 of the diaphragm 26. The adjusting sleeve 16 is so adjusted, that for the mid position of the diaphragm the space between said sleeve 16 and the top head 27 and the space between the lower end of the stop 29 and the bottom head 28 are equal. However, the total movement of the diaphragm is purposely kept down to the smallest possible amount, which is necessary to obtain the required sensitiveness and permanence of adjustment of the apparatus, in view of the extra heavy walls used in the construction of the diaphragm or bellows, in order to withstand any possible high pressures generated by the liquid in the vapor tube.

Coincident with the mid position of the diaphragm 26 is the mid position of the push rod 54 of the switch 52, that is to say, in that instance the center between the flanges 55 of said push rod has to travel practically equal distances upward and downward to throw the switch out or in. And it is also evident from Fig. 1, that in said mid position of the diaphragm and push rod 54, the line 3—3 passing through the contact lines 52ª and 53ª of the bar 45, will pass through the center of the fulcrum pin 19 of the switch lever 37, to neutralize the effect of the tension of the spring 50. In any other position of the diaphragh the bar 45 will swing about its contact line 52ª and will help to turn the switch lever 37 upwards or downwards as the case may be and this is made use of to overcome or compensate for the stiffness of the diaphragm as follows:

Assuming the vapor tension within the bellows has reached its minimum predetermined value corresponding to the lowest desired temperature of the refrigerator, the diaphragm will then be in its normal unstretched position, and the stop tube 29 will rest upon the lower head 28, in which position communication between the diaphragm 26 and the vapor tube 36 will be effected through a small opening 58 in the lower end of the stop tube 29. The curved forked end of the switch lever 37 will be at its maximum distance above the dead center line 3—3, throwing out the switch and thereby stopping the motor driving the refrigerating machine. As the temperature in the refrigerator rises, so will gradually rise the vapor tension within the diaphragm, and this tension must overcome the downward acting force exerted by the bar 45, the force necessary to stretch the bellows of the diaphragm, and to overcome the force required to throw in the switch. This former or stretch force of the diaphragm, however, is at its minimum value at the beginning of the stroke of the diaphragh 26, and will not increase unduly until such time as the contact lines 52ª and 53ª are about coinciding with the dead center line 3—3 of Fig. 1, since the amount the bellows have stretched is very small. The tension spring 50 has now been stretched to its maximum and its tension will help to push the switch lever 37 upwards the moment the aforesaid vapor tension is sufficient to throw the contact line 53ª of the push bar 45 above the dead center line 3—3 thus compensating for the stiffness of the bellows. At the time the temperature in the refrigerator has reached its highest desired temperature, the vapor tension within the diaphragm will be at its maximum, and the force combined with the upward push of the bar 45 will throw the upper head 27 of the diaphragm against the stop sleeve 16. The curved end 44 of the lever switch engaging the lower flanged part of the push rod 54 is now at its lowest position and has thrown in the switch 52, thereby again starting the motor driving the refrigerating machine.

The compensating device above described is indispensable in thermostats using extra heavy diaphragms, which should be employed for the reasons stated above.

While I have shown in the drawings and described in the specification, the main parts arranged in a vertical position, and by preference have and will so employ them, yet, I desire it to be understood, that changes in positions, arrangement and details of construction, so long as they fall within the scope of the claims, may be resorted to without departing from the spirit or sacrificing any advantages of the invention.

Having thus fully described my invention, what I claim as new and desire to secure by Letters Patent is—

1. In a device of the character described, the combination with a longitudinally extensible casing having its ends closed and fixedly supported at one end, of means constantly in communication with the casing for the passage of a suitable fluid, means within the casing and carried by the movable end thereof for limiting the movement of the casing in one direction, means adjustably supported outwardly of said movable end to restrict its movement in the opposite direction, and an operating lever fulcrumed near said end of the casing and transversely disposed with respect to the casing and pivotally connected axially to the movable end thereof.

2. In a device of the character described, the combination with a longitudinally extensible casing having its ends closed and fixedly supported at one end, of means communicating with the casing for the passage of a suitable fluid, means within the casing and carried by a movable part thereof for limiting the movement of the casing in one direction, means adjustably supported outwardly of the movable end of the casing to restrict its movement in the opposite direction, a projection adjustably and axially mounted on the movable end of the casing, and a suitably fulcrumed operating lever transversely disposed with respect to said casing and pivotally connected near its fulcrum to said axial projection.

3. In a device of the character described, the combination with a longitudinally extensible casing having its ends closed and fixedly supported at one end, of means constantly in communication with the casing for the passage of a suitable fluid, means within the casing and carried by the movable end thereof for limiting the movement of the casing in one direction, means supported outwardly of said movable end to restrict its movement in the opposite direction, an operating lever fulcrumed near said end of the casing and transversely disposed with respect to the casing and pivotally connected axially to the movable end thereof, said lever adapted at one of its ends to operably engage an element to be operated thereby, and means operatively connected to the opposite end of said lever for the purpose of compensating for the resistance of the extensible casing and for counter-balancing the pressure therein and the force required to operate said lever.

4. In a device of the character described, the combination with a thermostatically operable longitudinally expansible cylindrical casing having its ends closed and fixedly supported at one end, means carried by a movable part of the casing to limit its movement in one direction, means adjustably supported near the movable end of the casing to restrict its movement in the opposite direction, an operating lever fulcrumed near the movable end of the casing and transversely disposed with respect to the casing and pivotally connected axially to the movable end thereof, said lever adapted at one of its ends to operably engage an element to be operated thereby, and means operatively connected to the opposite end of said lever for the purpose of compensating for the resistance of the expansible casing and for counter-balancing the pressure therein and the force required to operate said lever.

5. In a device of the character described, the combination with a thermostatically operable circumferentially-corrugated longitudinally-expansible cylindrical casing having its ends closed and fixedly supported at one end, of means communicating with said casing for supplying a suitable thermostatic medium thereto, means within the casing and carried by the movable end thereof for limiting the movement of the casing in one direction, means adjustably supported outwardly of said movable end to restrict its movement in the opposite direction, a suitably fulcrumed operating lever diametrically disposed with respect to said casing and pivotally connected axially to the movable end thereof and adapted at one of its ends to operably engage an element to be operated thereby, and means operatively connected to the opposite end of said lever for the purpose of compensating for the resistance of the expansible casing and for counter-balancing the thermostatic pressure therein and the force required to operate said lever.

6. In a device of the character described, the combination with a thermostatically operable longitudinally expansible casing having its ends closed and fixedly supported at one end, of a container in communication with said casing through the fixed end thereof, means carried by a movable part of the casing to limit its movement in one direction, means adjustably supported near the movable end of the casing to restrict its movement in the opposite direction, an operating lever fulcrumed near the movable end of the casing and transversely disposed with respect to the casing and pivotally connected axially to the movable end thereof, said lever adapted at one of its ends to operably engage an element to be operated thereby, said lever having an arm extended therefrom on its face opposed to the casing, another arm pivotally mounted at one of its ends near the side of the casing and extended in substantial parallelism with the arm of said lever, a spring connecting said arms, and a bar interposed between the pivoted arm and the end of the operating lever opposite its said operably engaged end.

7. In a device of the character described, the combination with a thermostatically operable longitudinally expansible casing having its ends closed and fixedly supported at one end of a container in communication with said casing through the fixed end thereof, means carried by a movable part of the casing to limit its movement in one direction and means adjustably supported near the movable end of the casing to restrict its movement in the opposite direction, an operating lever fulcrumed near the movable end of the casing and transversely disposed with respect to the casing and pivotally connected axially to the movable end thereof, said lever adapted at one of its ends to operably engage an element to be operated thereby and having at its opposed end a transversely disposed groove and provided with an arm extended from its face opposite the casing, another arm pivotally mounted at one of its ends near the side of the casing and extended in substantial parallelism with the arm of said lever, a spring connecting said arms, the pivoted arm having between its ends and on its surface adjacent said lever a transversely disposed groove, and a bar having its ends reduced and located in the grooves of said lever and pivoted arm.

8. In a device of the character described, the combination with a housing having a base fixed to one end thereof and provided in its other end with a circular screw-threaded opening, and on the last named end with spaced parallel lugs, said housing also having extended from its wall a pair of parallel arms, of a thermostatically operable longitudinally expansible casing located in said housing and having one of its ends secured to the base thereof and its other end provided with a closed head, a container in communication with said casing through the base of the housing, means within the casing and carried by the head at the other end thereof to limit its movement in one direction, a screw-threaded sleeve adjustably located in said opening of the housing to restrict the movement of the casing in the opposite direction, a switch operating lever fulcrumed between the said lugs of the housing and transversely disposed with respect to the casing and pivotally connected axially to the movable end thereof, an electrical switch mounted on said lugs and engaging one end of said lever, said lever having at its opposite end a transversely disposed groove and provided on its face opposite the housing with an arm mainly located between the fulcrum of said lever and its end engaging the switch, another arm pivoted at one of its ends to said arms of the housing and extended in substantial parallelism with said lever arm, a spring uniting said arms, said pivoted arm having on its surface adjacent said lever a transversely disposed groove, and a bar having its ends reduced and located in the grooves of said lever and pivoted arm.

9. In a device of the character described, the combination with a housing having a suitable base at one end and a centrally disposed opening at its other end, of a thermostatically operable longitudinally expansible casing located in said housing and having one of its ends secured to the base thereof and its other end provided with a closed head, a container in communication with said casing through the base of the housing, means within the casing and carried by said head to limit its movement in one direction, a sleeve adjustably mounted in said opening of the housing to restrict the movement of the casing in the opposite direction, a switch operating lever fulcrumed on the housing at one side of the longitudinal axis thereof and transversely disposed with respect to the casing and pivotally connected axially to the movable head thereof, a switch mounted on the housing and operably engaging one end of said lever, said lever having at its opposite end a transversely disposed groove and provided on its face opposite the housing with an arm mainly located between the fulcrum of said lever and its end engaging the switch, another arm pivotally mounted at one of its ends on the wall of the housing and extended in substantial parallelism with said lever arm, a coil spring uniting the opposite end of the pivoted arm to the lever arm, said pivoted arm having on its surface adjacent said lever a transversely disposed groove, and a bar having its ends reduced and located in the grooves of said lever and said pivoted arm.

10. In a device of the character described, the combination with a housing having a suitable base at one end and a centrally disposed opening at its other end, of a thermostatically operable longitudinally expansible casing located in said housing and having one of its ends secured to the base thereof and its other end provided with a closed head having centrally on its inner surface a projection and centrally on its outer surface a socketed projection extended through the opening in said housing, a container in communication with said casing through the base of the housing, a stop tube secured at one of its ends on the inner projection of said head and having near its other end an opening in its wall, a sleeve adjustably mounted in the opening of the housing, a switch operating lever fulcrumed on the housing at one side of the longitudinal axis of said casing and transversely disposed with respect to the casing, a pivot member mounted on the outer projection of the head of said casing and pivotally connected to said operating lever, a switch mounted on the housing and operably engaging one end of said lever, said lever having at its opposite end a transversely disposed groove and provided on its face opposite the housing with an arm, another arm pivotally mounted at one of its ends on the wall of the housing and extended in substantial parallelism with said lever arm, a coil spring uniting the opposite end of the pivoted arm to the lever arm, said pivoted arm having on its surface adjacent said lever a transversely disposed groove, and a bar having its ends reduced and located in the grooves of said lever and said pivoted arm.

11. A device of the character described, including in combination a suitably mounted switch, a longitudinally extensible casing having its ends closed and fixedly supported at one end, of means constantly in communication with the casing for the passage of a suitable fluid, an operating lever fulcrumed near the movable end of the casing and transversely disposed with respect to the casing and pivotally connected axially to the movable end thereof and having one of its ends in operative engagement with said switch and its other end provided with a groove, said lever having an arm extended from its surface opposite the casing, another arm located in substantial parallelism with said lever arm and mounted at one end to swing about a fixed pivot, the last named arm having between its ends and on its surface adjacent said lever a transversely disposed groove, a bar having its ends reduced and located in the grooves of said lever and said pivoted arm, and a coil spring connecting the lever arm and the pivoted arm.

12. In a device of the character described, the combination with a housing having a suitable base at one end and a centrally disposed opening at its other end, of a thermostatically operable longitudinally expansible casing located in said housing having one of its ends secured to the base thereof and its other end provided with a closed head having centrally on its inner surface a projection and centrally on its outer surface a socketed projection extended through the opening in said housing, a container having communication with said casing, a stop tube secured at one of its ends on the inner projection of said tube and having near its other end an opening in its wall, a sleeve adjustably mounted in the opening of the housing, a switch operating lever fulcrumed on the housing at one side of the longitudinal axis of said casing and transversely disposed with respect to the casing, a pivot member mounted on the outer projection of the head of said casing and pivotally connected to said operating lever, a switch mounted on the housing and operably engaging one end of said lever, said lever provided on its face opposite the housing with an arm, another arm pivotally mounted at one of its ends near the wall of the housing and extended in substantial parallelism with said lever arm, a coil spring uniting the opposite end of the pivot arm to the lever arm, a bar interposed between the pivoted arm and the adjacent end of the operating lever and pivotally connected at its ends thereto, the pivoted ends of said bar and the pivots of the operating lever being located in a common plane when the said casing is in its mid-position.

13. A device of the character described, including in combination a suitably mounted switch, a longitudinally extensible casing having its ends closed and fixedly supported at one end, of means constantly in communication with the casing for the passage of a suitable fluid, an operating lever fulcrumed near the movable end of the casing and transversely disposed with respect to the casing and pivotally connected axially to the movable end thereof and having one of its ends in operative engagement with said switch, said lever having an arm extended from its surface opposite the casing, another arm located in substantial parallelism with said lever arm and mounted at one end to swing about a fixed pivot, a bar interposed between the last named arm and the adjacent end of the operating lever and having its ends in pivotal engagement therewith, and a coil spring connecting the lever arm and said pivoted arm.

JULIUS FRANKENBERG.